United States Patent
Tsuwako et al.

(10) Patent No.: US 8,125,727 B2
(45) Date of Patent: Feb. 28, 2012

(54) DISK DRIVE AND METHOD FOR ADJUSTING COMMON-MODE VOLTAGE OF AN ELEMENT ON A HEAD-SLIDER

(75) Inventors: Kazushi Tsuwako, Tokyo (JP); Yuusuke Matsuda, Nagano (JP); Masashi Murai, Kanagawa (JP); Toshiya Shiramatsu, Kanagawa (JP)

(73) Assignee: Hitachi Global Storgae Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/562,589

(22) Filed: Sep. 18, 2009

(65) Prior Publication Data

US 2011/0090586 A1  Apr. 21, 2011

(30) Foreign Application Priority Data

Sep. 19, 2008  (JP) ................................ 2008-241856

(51) Int. Cl.
*G11B 21/02* (2006.01)
*G11B 5/12* (2006.01)

(52) U.S. Cl. ............................................ 360/75; 360/59
(58) Field of Classification Search ........................ None
See application file for complete search history.

(56) References Cited

U.S. PATENT DOCUMENTS

| | | | |
|---|---|---|---|
| 4,879,610 A | 11/1989 | Jove et al. | |
| 5,701,213 A | 12/1997 | Cameron et al. | |
| 7,457,070 B2 * | 11/2008 | Matsushita | 360/75 |
| 7,656,600 B2 * | 2/2010 | Dakroub et al. | 360/46 |
| 2003/0218813 A1 | 11/2003 | Dakroub | |
| 2007/0217053 A1 | 9/2007 | Sugimoto | |

* cited by examiner

*Primary Examiner* — K. Wong (57) ABSTRACT

A disk drive. The disk drive includes a disk configured to store data, a motor configured to rotate the disk, a head-slider and a controller. The head-slider includes a slider configured to fly in proximity to a recording surface of the disk, and an element on the slider. The controller is configured to measure a fly height between the head-slider and the disk at different common-mode voltages of the element to determine an operational common-mode voltage from a measurement result.

18 Claims, 5 Drawing Sheets

DISK DRIVE AND METHOD FOR ADJUSTING COMMON-MODE VOLTAGE OF AN ELEMENT ON A HEAD-SLIDER

CROSS-REFERENCE TO RELATED APPLICATION

This application claims priority from the Japanese Patent Application No. 2008-241856, filed Sep. 19, 2008, the disclosure of which is incorporated herein in its entirety by reference.

TECHNICAL FIELD

Embodiments of the present invention relate to a disk drive and a method for adjusting a common-mode voltage of an element of a head of a head-slider.

BACKGROUND

Disk drives using various kinds of media, such as optical disks, magneto-optical disks, flexible magnetic-recording disks, and similar disks for data-storage are known in the art. In particular, hard-disk drives (HDDs) have been widely used as data-storage devices that have proven to be indispensable for contemporary computer systems. Moreover, HDDs have found widespread application to moving image recording and reproducing apparatuses, car navigation systems, cellular phones, and similar devices, in addition to computers, due to their outstanding information-storage characteristics.

Magnetic-recording disks used in HDDs have multiple concentric data tracks and servo tracks. Each servo track includes multiple servo data that include address information. Each data track includes multiple data sectors that include user data. Data sectors are recorded between the servo data located at discrete locations along the circumferential direction of a track. A magnetic-recording head incorporated in head-slider supported by a rotary actuator accesses a desired data sector of a track determined by address information contained in servo data to write data to, or alternatively, to read data from, the data sector.

A head-slider is bonded on a suspension of an actuator. The pressure caused by air viscosity between an air bearing surface (ABS) of the head-slider facing a magnetic-recording disk and the spinning magnetic-recording disk balances the pressure applied by the suspension toward the magnetic-recording disk so that the head-slider flies in proximity to the recording surface of the magnetic-recording disk with a certain fly height. The actuator rotates on a pivot shaft to move the head-slider to a target data track and positions the head-slider over the track. The magnetic-recording disk is secured to a spindle motor; and, the magnetic-recording disk, or alternatively, the head-slider, may acquire an electrical charge, for example, through tribo-electricity generated between a rotating magnetic-recording disk and a head-slider flying in proximity to the recording surface of the magnetic-recording disk, when the spindle motor rotates the magnetic-recording disk. Engineers and scientists engaged in the development of magnetic-recording technology are interested in developing procedures to control the affects of the build-up of the electrical charge because electrical charge may cause an electrical discharge between the magnetic-recording disk and the head-slider that affects the high levels of reliability demanded by the market for HDDs.

SUMMARY

Embodiments of the present invention include a disk drive. The disk drive includes a disk configured to store data, a motor configured to rotate the disk, a head-slider and a controller. The head-slider includes a slider configured to fly in proximity to a recording surface of the disk, and an element on the slider. The controller is configured to measure a fly height between the head-slider and the disk at different common-mode voltages of the element to determine an operational common-mode voltage from a measurement result.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Disk Drive and a Method for Adjusting Common-Mode Voltage of an Element on a Head-Slider In accordance with embodiments of the present invention, a magnetic-recording disk is connected to a system ground through the spindle motor. There is a limit to the reduction of the resistance between the system ground and the spindle motor and it is extremely difficult to reduce the voltage of the magnetic-recording disk to 0V. Particularly, recent spindle motors employ fluid dynamic bearings. The electrical conductivity of oil used in a fluid dynamic bearing is low and the low electrical conductivity makes it more difficult to remove electric charges from the magnetic-recording disk by connecting the magnetic-recording disk to the system ground.

In accordance with embodiments of the present invention, if a magnetic-recording disk is electrically charged, charges of the opposite polarity are induced on the surface of a head-slider flying in proximity to the recording surface of the magnetic-recording disk and a voltage difference is developed between the magnetic-recording disk and the head-slider. If there is a large voltage difference between the magnetic-recording disk and the head-slider, an arc discharge may occur between the magnetic-recording disk and the magnetic-recording head that may damage the magnetic-recording head. Therefore, a technique may be used to change the intermediate voltage, which is the common-mode voltage, due to the bias current, which is the sensing current, supplied to a read element in response to the voltage of the magnetic-recording disk to prevent the arc discharge.

Embodiments of the present invention have been developed in response to the difficulty encountered in directly measuring the voltage of a magnetic-recording disk. Additionally, even if the intermediate voltage of the read element due to the bias current is set, the system ground, the voltages of the head-slider and the magnetic-recording disk do not agree with each other because there is a voltage difference between the magnetic-recording disk and the system ground as described above. Even if there is a small voltage difference between the magnetic-recording disk and the head-slider, which poses little possibility of arc discharge, the voltage difference between the magnetic-recording disk and the head-slider can have other deleterious effects besides arc discharge. For example, the voltage difference between the magnetic-recording disk and the head-slider draws the head-slider toward the magnetic-recording disk by action of electrostatic attraction due to the Coulomb force between the magnetic-recording disk and the head-slider attending the build-up of electrical charge. With recent increases in the recording density of HDDs, the fly height of the head-slider has decreased. As used herein, the term of art, "fly height," may also be referred to by the term of art, "flying height," for example, in FIG. 2. For example, the current fly height of a head-slider may only be on the order of several nanometers (nm). A further reduction of the fly height caused by the Coulomb force increases the possibility that any safety margin is dissipated; and, as a result, the head-slider and magnetic-recording disk may come into contact with one another.

With further relevance to embodiments of the present invention, contact between a head-slider and a magnetic-recording disk may cause damage to the head-slider and a magnetic-recording disk; and, moreover, contact may cause a reading error, or alternatively, a writing error. Furthermore, contact may transfer a deposit from the magnetic-recording disk, for example, lubricant, to the head-slider to cause the head-slider to stick to the magnetic-recording disk. Additionally, if there is a voltage difference between a head-slider and a magnetic-recording disk, an electrical current may flow between the head-slider and the magnetic-recording disk upon the occurrence of a contact between the head-slider and the magnetic-recording disk. The electrical current flowing between the head-slider and the magnetic-recording disk may also accelerate wear and corrosion of the magnetic-recording disk, which reduces the reliability of the HDD. Therefore, embodiments of the present invention are provided that are capable of reducing the voltage difference between a head-slider and a magnetic-recording disk as much as possible to maintain performance and reliability of an HDD.

In accordance with embodiments of the present invention, a disk drive includes a disk configured to store data, a motor configured to rotate the disk, a head-slider including a slider flying in proximity to the recording surface of the rotating disk and an element on the slider and a controller configured to measure the fly height between the head-slider and the disk at different common-mode voltages of the element to determine an operational common-mode voltage from a measurement result. Thus, in an embodiment of the present invention, the controller reduces the voltage difference between the head-slider and the disk.

In one embodiment of the present invention, the controller is configured to estimate a common-mode voltage for the highest fly height and is configured to use the element at the estimated common-mode voltage. Thus, in an embodiment of the present invention, the voltage difference between the head-slider and the disk is minimized.

In one embodiment of the present invention, the disk includes a magnetic-recording disk, and the element includes a read element of a magnetic-recording head; and, the read element includes a magnetoresistive element. In another embodiment of the present invention, the disk includes a magnetic-recording disk, and the element includes an element of a magnetic-recording head selected from the group consisting of a write element of a magnetic-recording head and a heater element of a magnetic-recording head. Thus, in an embodiment of the present invention, the voltage difference between the head-slider and the disk is maintained at a low level for a longer time interval.

In another embodiment of the present invention, the disk drive further includes a mechanism configured to adjust the fly height between the head-slider and the disk, and the controller is configured to measure the fly height by changing the fly height with the mechanism to bring the head-slider into contact with the disk at the different common-mode voltages. Thus, an embodiment of the present invention provides for measuring the fly height more precisely.

In one embodiment of the present invention, the controller is configured to measure the fly height using read-back signals read by a read element. Thus, in an embodiment of the present invention, the controller provides for measuring the fly height without contact between the head-slider and the disk.

In an embodiment of the present invention, the disk drive includes a plurality of head-sliders and the controller is configured to apply the measurement result on the head-slider to all other head-sliders of the plurality of head-sliders, which can reduce the processing time.

In an embodiment of the present invention, the recording surface is divided into a plurality of zones with respective recording frequencies, and the controller is configured to perform the measurement in different zones and is configured to determine a common-mode voltage for each of the different zones. Thus, an embodiment of the present invention provides for reduction of the voltage difference depending on the radial position of the magnetic-recording head.

In an embodiment of the present invention, the controller is configured to determine a timing for a measurement based on temperature variation from a temperature in a last measurement. Thus, an embodiment of the present invention provides for determining when to perform the common-mode voltage measurement.

Embodiments of the present invention also include a method for adjusting common-mode voltage of an element on a head-slider in a disk drive. The method includes rotating a disk, measuring the fly height of a head-slider flying in proximity to the recording surface of the rotating disk at different common-mode voltages of the element, determining an operational common-mode voltage from the measurement result, and operating the element at the operational common-mode voltage. Thus, an embodiment of the present invention reduces the voltage difference between the head-slider and the disk.

Thus, in accordance with embodiments of the present invention, the voltage difference between a head-slider and a disk is reduced. Hereinafter, embodiments of the present invention are subsequently described by way of example of a HDD, which is an example of a disk drive, without limitation thereto.

In accordance with embodiments of the present invention, a HDD adjusts the common-mode voltage of an element of a head-slider so as to reduce the voltage difference between a magnetic-recording disk and the head-slider. As used herein, the common-mode voltage is the intermediate voltage in an operation of an element. Although the adjustment of the common-mode voltage is applicable to both single-ended elements and differential elements, the adjustment of the common-mode voltage is applied to elements operating in the differential mode in view of detrimental effects to the operation of the element. In an embodiment of the present invention, an element for which the common-mode voltage is adjusted includes a magnetoresistive element, a read element, particularly a magnetoresistive element operated in the differential mode. The HDD measures the fly height of the head-slider at different common-mode voltages and determines an appropriate value for the common-mode voltage of the element from the measurement result.

The fly height of a head-slider varies with the common-mode voltage of an element. This is because variations in the common-mode voltage of an element result in variations in the voltage of the head-slider and the voltage difference between the head-slider and the magnetic-recording disk. If the voltage difference between a head-slider and a magnetic-recording disk increases, the fly height of the head-slider reduces.

In an embodiment of the present invention, a HDD measures the fly height at different common-mode voltages to determine an appropriate common voltage value within the adjustable range of the common-mode voltage. In an embodiment of the present invention, the HDD sets the common-mode voltage at the value to be expected to maximize the fly height within the adjustable range. The element operates at the set common-mode voltage, which is the operational common-mode voltage, in subsequent processes of the HDD. The voltage difference between the head-slider and the magnetic-recording disk is the smallest at the common-mode voltage where the slider fly height is the highest. By reducing the voltage difference between the head-slider and the magnetic-recording disk, the possibility of contact between the head-slider and the magnetic-recording disk is reduced and wear and corrosion of the magnetic-recording disk due to the electrical current flowing during the contact is suppressed.

Figure 1:
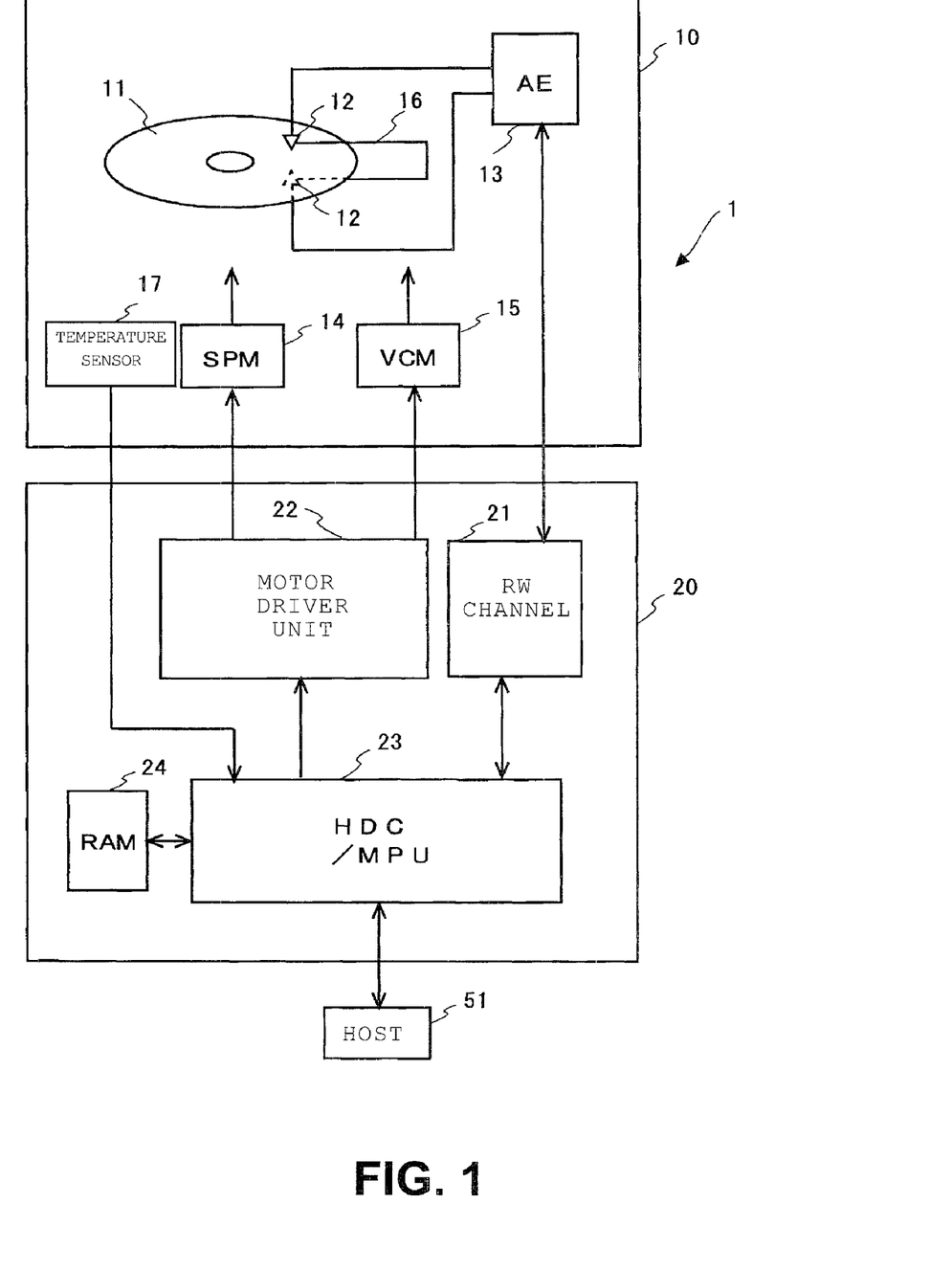
FIG. 1 is a block diagram schematically illustrating an example configuration of a HDD, in accordance with an embodiment of the present invention.

With reference now to FIG. 1, in accordance with an embodiment of the present invention, a block diagram is shown that illustrates an example configuration of a HDD 1. HDD 1 includes a magnetic-recording disk 11, which is a type of data-storage disk inside a disk enclosure (DE) 10. The use of a magnetic-recording disk and a magnetic-recording head in a HDD is by way of example without limitation thereto, as the use of other data-storage disks and heads in a disk drive is within the spirit and scope of embodiments of the present invention. A spindle motor (SPM) spins a magnetic-recording disk 11 at a specific angular rate. Head-sliders 12 are provided which access the corresponding recording surfaces of the magnetic-recording disk 11, respectively. As used herein, "access" is a term of art that refers to operations in seeking a data track of a magnetic-recording disk and positioning a magnetic-recording head on the data track for both reading data from, and writing data to, a magnetic-recording disk. Each of the head-sliders 12 includes a slider for flying in proximity to the recording surface of the magnetic-recording disk and a magnetic-recording head that is affixed to the slider and converts magnetic signals to and from electrical signals.

With further reference to FIG. 1, in accordance with an embodiment of the present invention, head-sliders 12 are affixed at the distal end of an actuator 16. In one embodiment of the present invention, each of the head-sliders 12 includes a heater element for causing the magnetic-recording head to expand and protrude to adjust the fly height. The actuator 16 is connected to a voice coil motor (VCM) 15 and rotates on the pivot shaft to move the head-sliders 12 while the head-sliders 12 are disposed in proximity to the recording surface of the spinning magnetic-recording disk 11 along a nominally radial direction of the rotating magnetic-recording disk 11. A moving mechanism of the head-sliders 12 includes the actuator 16 and the VCM 15.

With further reference to FIG. 1, in accordance with an embodiment of the present invention, on the circuit board 20 affixed on the outer surface of the DE 10, circuit elements are mounted. A motor driver unit 22 drives the SPM 14 and the VCM 15 in accordance with control data from a head-disk controller/microprocessor unit (HDC/MPU) 23. A random access memory (RAM) 24 functions as a buffer to temporally store read data and write data. An arm electronics (AE) module 13 in the DE 10 selects a head-slider 12 to access, for reading data from, or writing data to, the magnetic-recording disk 11 from a plurality of head-sliders 12, amplifies the read-back signals from the head-sliders 12, and transmits the read-back signals to a read-write channel (RW channel) 21. In addition, the AE module 13 transmits the write signals from the RW channel 21 to a selected head-slider 12. The AE module 13 further functions as an adjustment circuit for supplying a selected head-slider 12 with power and adjusting the power. In accordance with an embodiment of the present invention, HDD 1 may include just a single head-slider 12.

With further reference to FIG. 1, in accordance with an embodiment of the present invention, the RW channel 21, in a read operation, amplifies read-back signals supplied from the AE module 13 to have specific amplitudes, extracts data from the obtained read-back signals, and decodes the data. The read-back data includes user data and servo data. The decoded read user data and servo data are supplied to the HDC/MPU 23. The RW channel 21, in a write operation, code-modulates write data supplied from the HDC/MPU 23, converts the code-modulated data into write signals, and then supplies the write signals to the AE module 13.

With further reference to FIG. 1, in accordance with an embodiment of the present invention, the HDC/MPU 23, an example of a controller, performs control of the HDD 1 in addition to other processes concerning data processing, for example, reading and writing operation control, command execution order management, positioning control of the head-sliders 12 using servo signals, which provide servo control, interface control to and from a host 51, defect management, and error handling when any error occurs. A temperature sensor 17 is mounted in the DE 10. The HDC/MPU 23 sets operational parameters according to a temperature detected by the temperature sensor 17. In one embodiment of the present invention, the HDC/MPU 23 performs the adjusting process of the common-mode voltage of an element on the head-slider 12. Embodiments of the present invention include operations of the process, which are subsequently described in detail.

With further reference to FIG. 1, in accordance with an embodiment of the present invention, the HDC/MPU 23 determines a functional relationship between the common-mode voltage of an element on the head-slider and the fly height with measurement; and, the HDC/MPU 23 determines an appropriate operational common-mode voltage, which is a common-mode voltage under normal operations of the element. Specifically, the HDC/MPU 23 measures the fly height of the head-slider 12 and uses the common-mode voltage at which the highest fly height is expected as the operational common-mode voltage of the element. The common-mode voltage is limited within the adjustable range. Therefore, the operational common-mode voltage is the voltage at which the fly height is expected to be the highest within the range.

With further reference to FIG. 1, in accordance with an embodiment of the present invention, the adjustment of the common-mode voltage based on the measurement of fly height reduces the voltage difference between the head-slider 12 and the magnetic-recording disk 11 to maintain the fly-height margin and reduce the possibility of contact between the head-slider 12 and the magnetic-recording disk 11, and reduces the electrical current that may flow between the head-slider 12 and the magnetic-recording disk 11 upon contact between the head-slider 12 and the magnetic-recording disk 11 to suppress wear and corrosion of the magnetic-recording disk 11.

With further reference to FIG. 1, in accordance with another embodiment of the present invention, the head-slider 12 includes a read element including a magnetoresistive element, a write element including a coil and a heater element including a resistor. In an embodiment of the present invention, the HDC/MPU 23 adjusts the common-mode voltage of the read element to reduce the voltage difference between the head-slider 12 and the magnetic-recording disk 11. The read element is supplied with sensing current for reading servo data while the head slider 12 is in proximity to the recording surface of the magnetic-recording disk 11. Therefore, the adjustment of the common-mode voltage of the read element results in maintaining the voltage difference small between the head-slider 12 and the magnetic-recording disk 11 independently of processes, for example, a read process, a write process, or alternatively, operation modes such as a track-seeking mode and a track-following mode.

With further reference to FIG. 1, in accordance with another embodiment of the present invention, a read element is generally a magnetoresistive element such as a giant magneto-resistance (GMR) element, or alternatively a tunneling magneto-resistance (TMR) element; and, the read element is supplied with sensing current. In an embodiment of the present invention, the magnetoresistive element is driven in a differential mode in order not to change the sensing current in the common-mode voltage adjustment. The write coil, or alternatively, the heater element, may also be driven in a differential mode if their common-mode voltages are adjusted. In one embodiment of the present invention, a HDD might not include a write element, or alternatively, a heater element. In accordance with an embodiment of the present invention, an example common-mode adjustment process is next described for adjusting the common-mode voltage in the read element.

Figure 2:
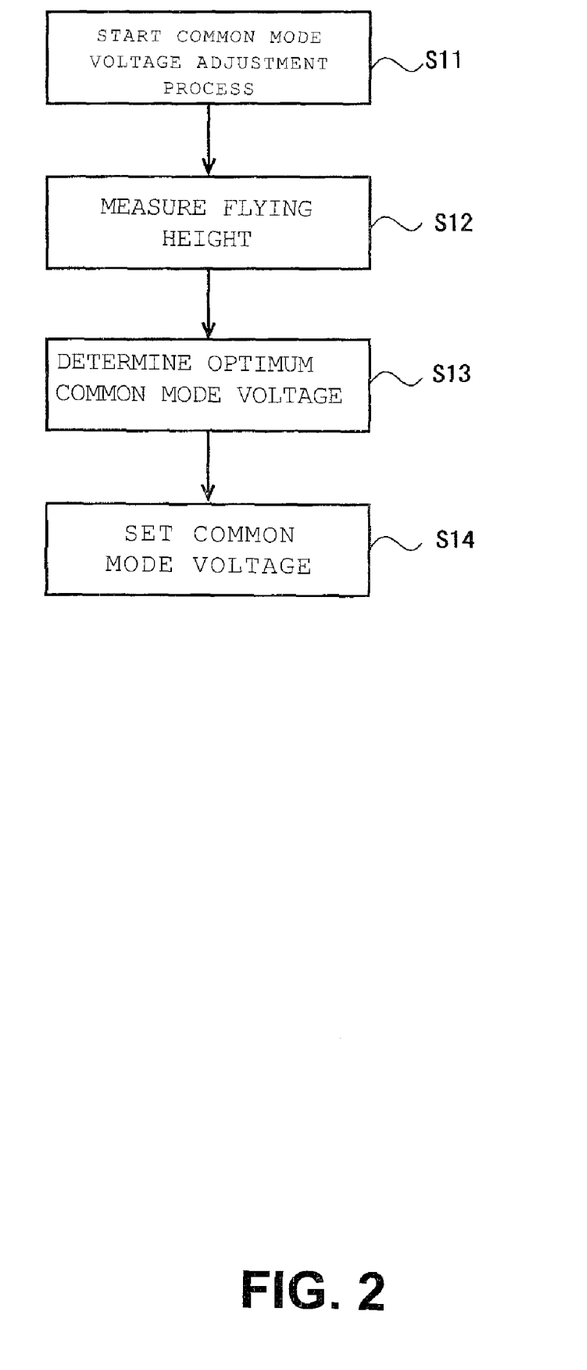
FIG. 2 is a flowchart showing a flow of an example common-mode adjustment process, in accordance with an embodiment of the present invention.

With reference now to FIG. 2, in accordance with an embodiment of the present invention, the process flow of an example common-mode adjustment process of the common-mode voltage with fly-height measurement is next described.

At S11, the HDC/MPU 23 starts a process for adjusting the common-mode voltage. At S12, the HDC/MPU 23 measures the fly height at different common-mode voltages. At S13, the HDC/MPU 23 determines the optimum common-mode voltage. At S14, the HDC/MPU 23 sets the optimum common-mode voltage as the operational common-mode voltage of the read element. The read element operates at the determined common-mode voltage in read operations from the magnetic-recording disk 11.

With further reference to FIG. 2, in accordance with an embodiment of the present invention, the HDC/MPU 23 sets operational parameters of the elements on the head-slider 12 by setting the control data in registers of the AE module 13. The operational parameters include: the write current of the write coil, which drives the write element; the sensing current of the magnetoresistive element, which drives the read element; the common-mode voltage of the magnetoresistive element; and, the heater power value of the heater element. The HDC/MPU 23 selects a head-slider 12 to access the magnetic-recording disk 11 by setting control data in a register of the AE module 13. The AE module 13 selects a head-slider 12 according to the control data set by the HDC/MPU 23 and provides the selected head-slider 12 with a specified common-mode voltage.

Figure 3:
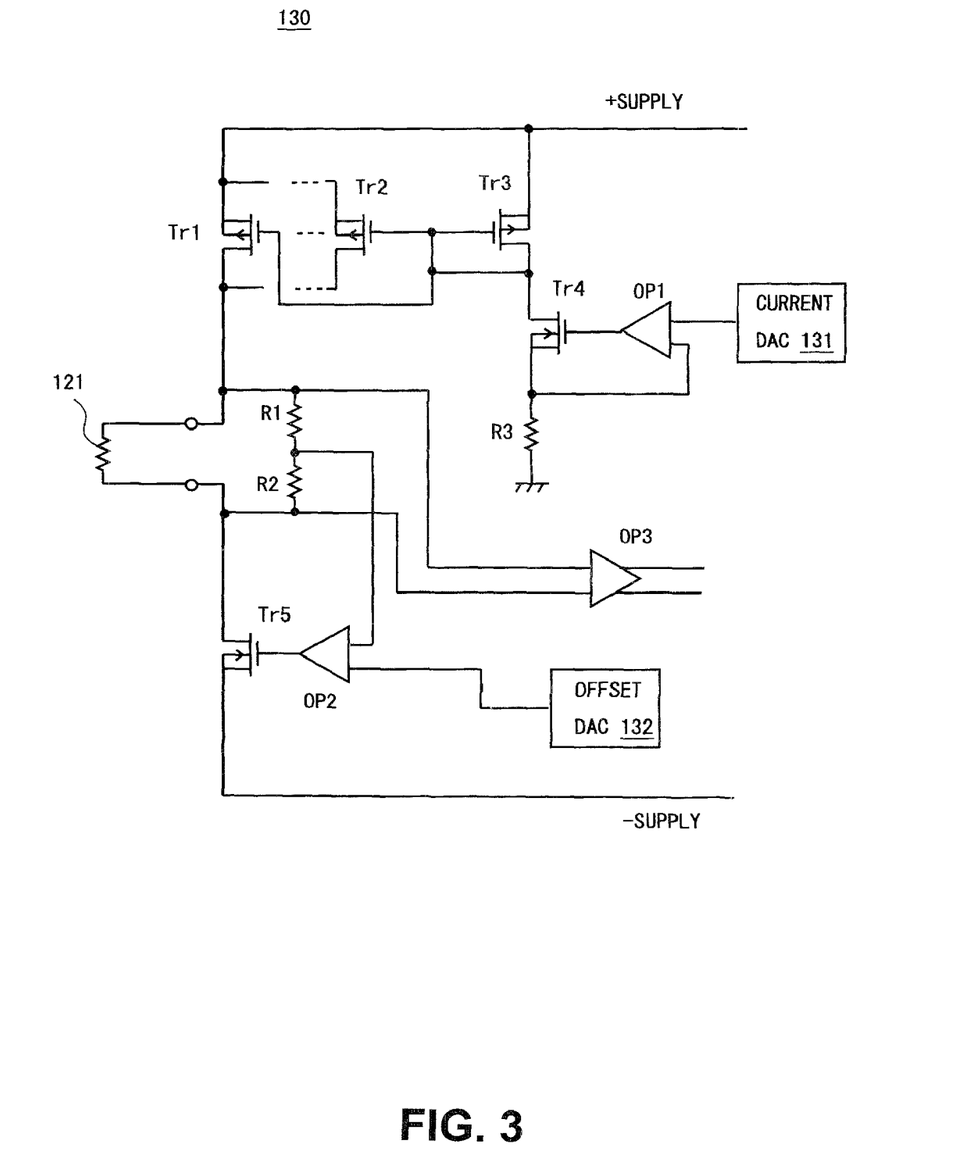
FIG. 3 is a circuit diagram of an example driver circuit in an arm electronics (AE) module including an adjustment circuit for the common-mode voltage of a read element, in accordance with an embodiment of the present invention.

With reference now to FIG. 3, in accordance with an embodiment of the present invention, a schematic circuit diagram is shown. FIG. 3 shows the configuration of an example head-bias circuit 130 in the AE module 13 for the read element 121. The head-bias circuit 130 is connected between a positive power rail and a negative power rail. As used herein, the term of art, "rail," refers to opposite bus supply lines of an electrical power supply. In accordance with an embodiment of the present invention, a constant current power sully circuit includes: Transistors Tr1 to Tr3 connected in parallel, a transistor Tr4 connected to the transistor Tr3 in series, an operational amplifier OP1 controlling the transistor Tr4, a resistor R3 connected to the transistor Tr4 in series and a current DAC 131 controlling the output of the operational amplifier OP1. The output of the current DAC 131 defines the output current of the constant current power sully circuit, namely the sensing current passing across the read element 121. The HDC/MPU 23 sets control data in the AE module 13 to control the output value of the current DAC 131. A variation in an external magnetic field causes a variation in the resistance value of the read element 121, resulting in a variation in the voltage across the read element 121. This variation in the voltage is provided to the RW channel 21 as a read-back signal through an operational amplifier OP 3.

With further reference to FIG. 3, in accordance with the embodiment of the present invention described above, an adjustment circuit of the common-mode voltage includes: resistors R1 and R2 connected in series which are connected to the read element in parallel; a transistor Tr5 connected to the resistors R1 and R2 in series; an operational amplifier OP2 one of whose inputs is connected to an intermediate node between the resistors R1 and R2, which controls the transistor Tr5; and an offset DAC 132 controlling the operational amplifier OP2. In one embodiment of the present invention, the resistance values of the resistors R1 and R2 are the same. The voltage at the intermediate node of the resistors R1 and R2 is the common-mode voltage and the center voltage of the read element 121. The output of the offset DAC 132 changes the common-mode voltage. The output of the offset DAC 132 follows control data set in the AE module 13 by the HDC/MPU 23.

With further reference to FIGS. 2 and 3, in accordance an embodiment of the present invention, at S11, a time to start the adjustment process of the common-mode voltage with fly-height measurement is in the initialization process on start up. Since the voltage of the magnetic-recording disk 11 changes according to environment, the voltage difference between the head-slider 12 and the magnetic-recording disk 11 also changes according to environment if the common-mode voltage of the read element 121 is held constant. However, if the adjustment process of the common-mode voltage is performed at some arbitrarily chosen time, the performance of the HDD 1 may be adversely affected. On the other hand, the use environment of the HDD 1 does not usually change greatly after start-up. Therefore, adjusting the common-mode voltage at every start-up may provide stable control of the voltage variation of the magnetic-recording disk 11 due to environment.

With further reference to FIGS. 2 and 3, in accordance an embodiment of the present invention, a HDD that is expected to be subjected to environmental variation may also be expected to adjust the common-mode voltage based on the fly height at some time after start-up. In an embodiment of the present invention, the HDC/MPU 23 performs the adjustment when effects on the performance are small, after a preset time has elapsed after start-up. For example, the HDC/MPU 23 performs the adjustment during an idling time when the HDC/MPU 23 is released from command processing. Thus, in an embodiment of the present invention, the HDC/MPU 23 sets more appropriate common-mode voltages according to environmental variation after some lapse of time. Another factor largely influencing the voltage of the magnetic-recording disk 11 is temperature, which is next described.

Figure 4:
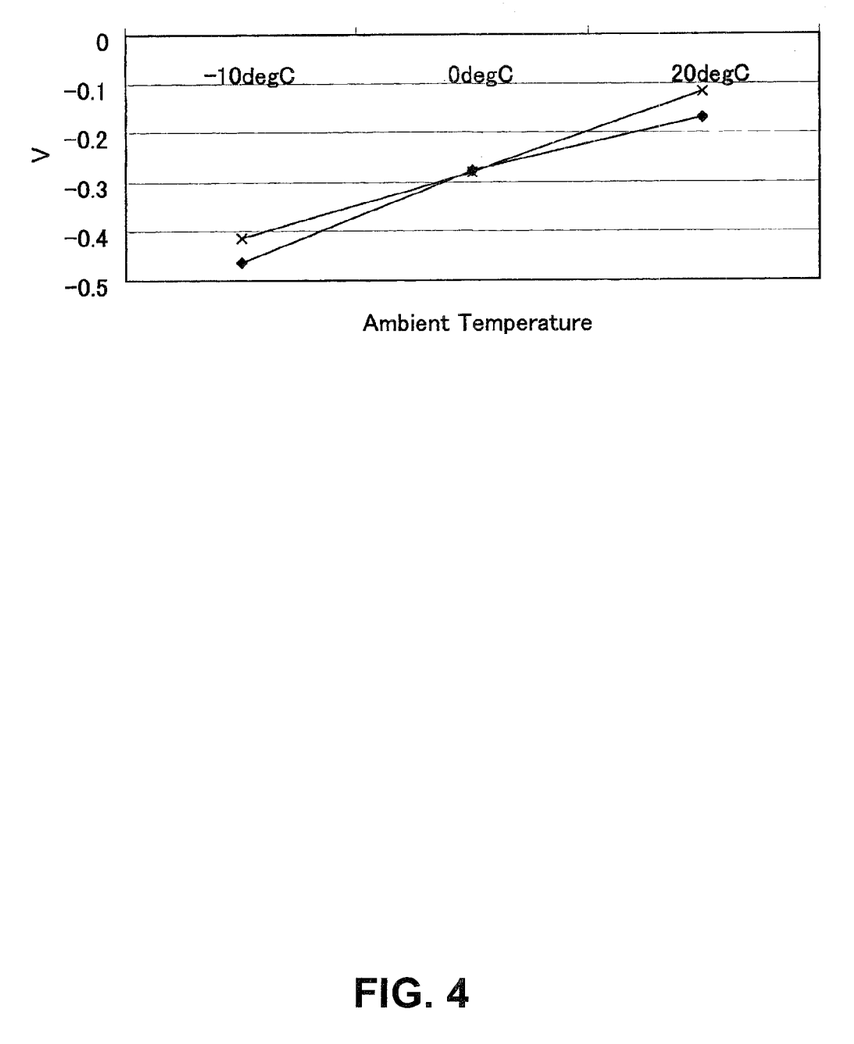
FIG. 4 is a plot that illustrates a measurement result showing an example graphical relationship between the drive temperature and the voltage of a magnetic-recording disk, in accordance with an embodiment of the present invention.

With reference now to FIG. 4, in accordance with an embodiment of the present invention, a plot of a measurement result is shown. As shown in FIG. 4, the measured data illustrates an example graphical relationship between temperature and the voltage of the magnetic-recording disk 11. As understood from FIG. 4, the voltage, V, of the magnetic-recording disk 11 increases with temperature. The HDC/MPU 23 may utilize the graphical relationship between the disk voltage, V, and temperature in determining the time for adjustment of the common-mode voltage with fly-height measurement. For example, the HDC/MPU 23 may perform the common-mode voltage adjustment if a temperature change from a temperature at a last common-mode voltage adjustment is more than a threshold value, instead of performing a common-mode voltage adjustment at every start-up. The HDC/MPU 23 may ascertain the drive temperature by referring to the temperature sensor 17. The HDC/MPU 23 may store detected temperatures corresponding to common-mode voltage adjustments in a nonvolatile memory, for example, on the magnetic-recording disk 11, itself, or alternatively, in an electrically erasable programmable read only memory (EEPROM) for comparison of the stored value with a current detected temperature in the initialization process at start-up.

With further reference to FIGS. 2 and 4, in accordance with an embodiment of the present invention, the HDC/MPU 23 may similarly perform the common-mode voltage adjustment after start-up on a condition that a temperature change from the temperature at the last common-mode voltage adjustment is more than a threshold value. In an embodiment of the present invention, the HDC/MPU 23 performs the common-mode voltage adjustment based on the fly-height measurement during an idling time, when the HDC/MPU 23 is released from command processes if a temperature change from the temperature at the last common-mode voltage is more than a threshold value. In the fly-height measurement, at S12, the HDC/MPU 23 changes the common-mode voltage to measure the fly height at different common-mode voltages. In the fly-height measurement, the HDC/MPU 23 may measure the absolute fly height; however, it is sufficient if the HDC/MPU 23 measures relative differences between fly heights. Typically, the AE module 13 may change the common-mode voltage within a limited variable range. The HDC/MPU 23 specifies the common-mode voltage by a digital value. For example, in one embodiment of the present invention, the AE module 13 may change the common-mode voltage from −500 mV to +500 mV; and, the HDC/MPU 23 measures the fly height at multiple common-mode voltages selected from the above range. For example, in another embodiment of the present invention, the HDC/MPU 23 selects common-mode voltages used for the fly-height measurement in 100 mV increments; and, the HDC/MPU 23 measures the fly height in the same range as the variable range of the operational common-mode voltage. The range of fly-height measurement may be different from the range of fly-height measurement of the operational common-mode voltage.

With further reference to FIG. 4, in accordance with embodiments of the present invention, there exist various ways for the HDC/MPU 23 to measure the fly height of the head-slider 12. For example, the gain of the variable gain amplifier in the RW channel 21 increases with the fly height in read operations of servo signals, a servo signal of which is one of the two types of read-back signals. Therefore, the HDC/MPU 23 measures fly-height variations by obtaining the servo gain from the RW channel 21. However, the servo gain is not always accurate for indicating the fly height. Therefore, in an embodiment of the present invention, a measurement method measures the fly height by use of the resolution, where the resolution is characterized in terms of frequency components of the resolution, of data recorded on the magnetic-recording disk 11. For example, the resolution may be represented by a ratio between a specific low frequency signal and a specific high frequency signal. If the fly height decreases, the high frequency component of a read-back signal increases and the resolution increases. The HDC/MPU 23 measures the resolution at different common-mode voltages and determines the common-mode voltage for the minimum acceptable resolution, namely the common-mode voltage for the highest fly height. The HDC/MPU 23 may also calculate the resolution by alternative computations, or alternatively, determine the resolution from the parameters of the RW channel 21. For example, the RW channel 21 is equipped with a digital filter for correcting frequency components in read-back signals. The RW channel 21 corrects the tap values of the filter from a measurement result of read-back signals. The correction values relate to the resolution. If the RW channel 21 is equipped with a digital filter for restoring a read-back signal of a specific pattern to a reference pattern, the HDC/MPU 23 may use the correction values for the resolution component of the correction coefficients of the digital filter.

With further reference to FIG. 4, in accordance with embodiments of the present invention, a way to measure the fly height uses heater power values to cause contact of the head-slider 12 with the magnetic-recording disk 11. The measurement upon actual contact of the head-slider 12 with the magnetic-recording disk provides a more precise fly-height measurement than using values obtained from read-back signals, for example, such as the servo gain and resolution as previously described. In an embodiment of the present invention, frequent contacts of the head-slider 12 and the magnetic-recording disk are to be avoided in a HDD, for a measurement without contact as previously described. If the HDD 1 includes an alternative fly-height adjustment mechanism different from a heater element, the HDD 1 may use the alternative adjustment mechanism.

With further reference to FIG. 4, in accordance with embodiments of the present invention, the HDC/MPU 23 gradually increases the heater power at a specific common-mode voltage to determine the heater power value where the head-slider 12 comes into contact with the magnetic-recording disk 11. The HDC/MPU 23 detects the contact between the head-slider 12 and the magnetic-recording disk 11 by referring to the amplitude variation of read-back signals, or alternatively, the operational variation of the VCM 15 or SPM 14. Alternatively, if the RW channel 21 includes a contact detection function, the HDC/MPU 23 may use the contact detection function. The HDC/MPU 23 measures heater power values to bring the head-slider 12 into contact with the magnetic-recording disk 11 at different common-mode voltages. The HDC/MPU 23 determines the common-mode voltage for the highest fly height, namely the common-mode voltage for the maximum contact heater power value. This common-mode voltage is the common-mode voltage to minimize the voltage differences between the magnetic-recording disk 11 and the head-slider 12 and is selected as the common-mode voltage in the measurement.

With further reference to FIG. 4, in accordance with another embodiment of the present invention, the HDC/MPU 23 performs measurements for determining common-mode voltages in multiple zones. As is known in the art, a recording surface of the magnetic-recording disk 11 is divided into a plurality of zones in the radial direction. Typically, the recording frequency of the write element, the sensing current of the read element, and the heater power of the heater element are set for each zone. Thus, the common-mode voltage setting for individual zones facilitates the reduction of the voltage difference between the magnetic-recording disk 11 and the head-slider 12 regardless of the radial position. Although fly-height measurements may be performed at all zones, the HDC/MPU 23 may perform the fly-height measurement at different common-mode voltages over a portion of the zones and apply the measurement result to the other zones. For example, HDC/MPU 23 may perform measurements at odd numbered zones starting from the innermost zone and may apply a measurement result to the corresponding zone and an adjacent zone, for example, an even numbered zone.

With further reference to FIG. 4, in accordance with another embodiment of the present invention, the HDC/MPU 23 may perform the fly-height measurement for the common-mode voltage adjustment for all the head-sliders 12. However, the process to determine the optimum common-mode voltage takes considerable processing time because the process for determining the optimum common-mode voltage includes a fly-height measurement. On the other hand, the voltage of the magnetic-recording disk 11 depends mainly on the structure of the SPM 14, especially the kind of oil in the SPM 14, which has a fluid dynamic bearing structure. Therefore, the voltages of magnetic-recording disks 11 are expected to be substantially the same. Thus, in an embodiment of the present invention, the HDC/MPU 23 selects one of the multiple head-sliders 12 to determine the optimum common-mode voltage with a fly-height measurement; and, the HDC/MPU 23 further applies the optimum common-mode voltage determined with the fly-height measurement for the selected head-slider 12 to the other head-sliders 12. Thus, in an embodiment of the present invention, the optimum common-mode voltages for all the head-sliders 12 are determined and the processing time is reduced. For embodiments of the present invention described above, the HDC/MPU 23 designates discrete common-mode voltage values to perform the fly-height measurement.

Figure 5:
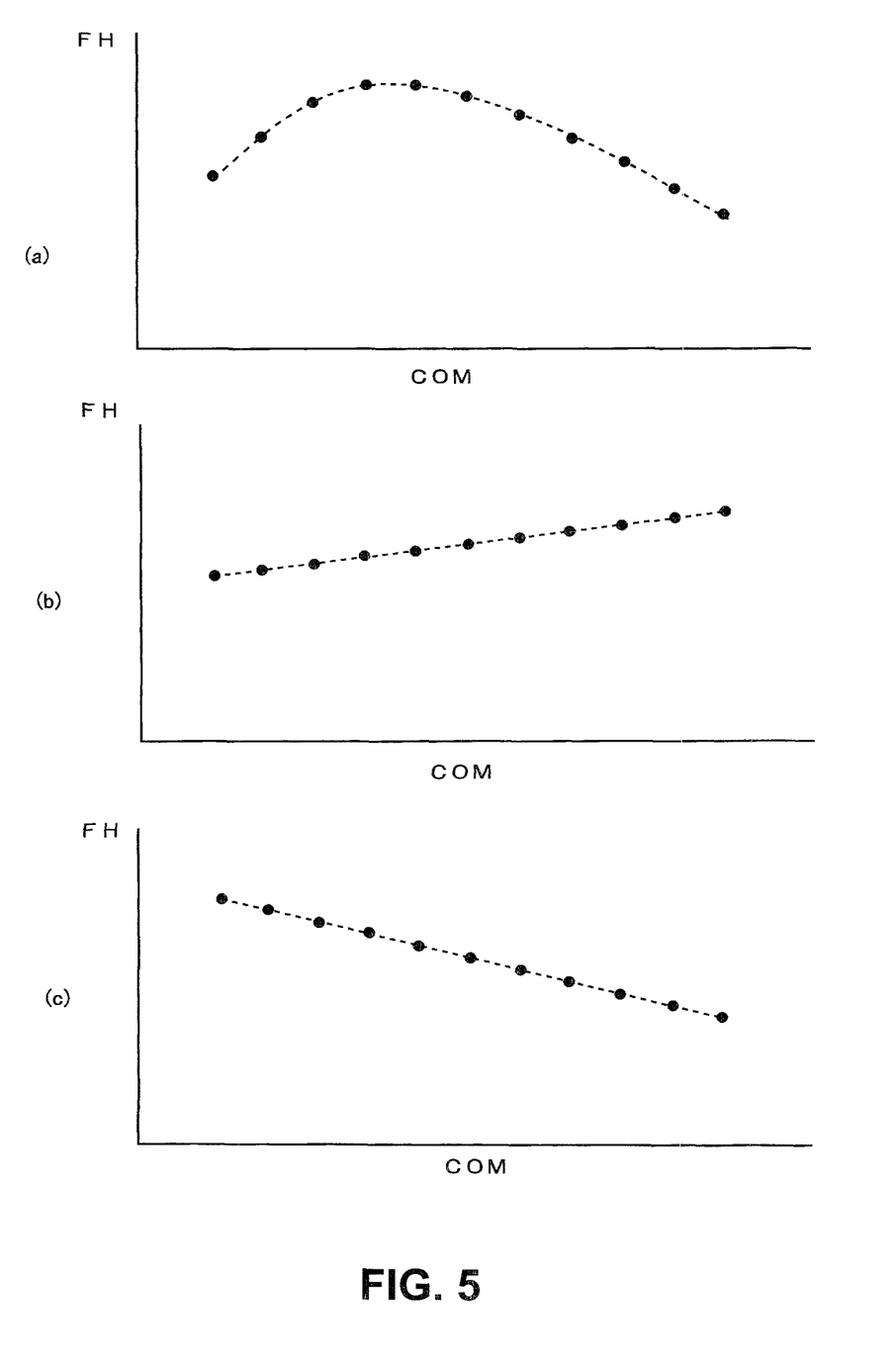
FIGS. 5(a)-5(c) are plots of example graphical relationships between common-mode voltages and measured fly-height values, in accordance with an embodiment of the present invention.

With reference now to FIGS. 5(a)-5(c), in accordance with an embodiment of the present invention, graphs are shown of example graphical relationships between common-mode voltages (COM) and measured fly-height values (FH). In each graph, black points represent measured values and the broken line shown in each graph is a line that approximately fits the measured values. The graphical relationship between the common-mode voltage and the measured fly height may assume the three forms shown in each of the graphs. Specifically, the fly height with reference to the common-mode voltage may exhibit: a convex upward line, a monotonically increasing line, or alternatively, a monotonically decreasing line. Under usual circumstances for practical designs, the adjustable range of the common-mode voltage is set in such a way that the highest fly height appears within a measurement range as shown in FIG. 5(a). Typically, the HDC/MPU 23 selects a common-mode voltage in operations of the read element, which is an operational common-mode voltage, from common voltages designated in a measurement (shown by black circles in FIG. 5). The HDC/MPU 23 is programmed to accept the common-mode voltage for the highest fly height in the measurement as the common-mode voltage for the actual highest fly height and to use the value of the common-mode voltage for the highest fly height in operation of the read element. The common-mode voltage for the actual highest fly height is the common-mode voltage corresponding to the fourth measured value from the left in FIG. 5(a), the rightmost measured value in FIG. 5(b), or the leftmost measured value in FIG. 5(c).

With further reference to FIG. 5(a), in accordance with an embodiment of the present invention, under different circumstances, the HDC/MPU 23 is programmed to accept a common-mode voltage at which no actual measurement is made as the common-mode voltage for the actual highest fly height from a measurement result and selects the common-mode voltage as the operational common-mode voltage. For example, the HDC/MPU 23 determines the median value between the two common-mode voltages at the highest fly heights (the fourth and fifth measured values from the left in FIG. 5(a)) and is programmed to accept the median value as the common-mode voltage for the actual highest fly height.

With further reference to FIGS. 5(b) and 5(c), in accordance with an embodiment of the present invention, the HDC/MPU 23 is not prohibited from selecting a voltage out of the range of common-mode voltage useable in fly-height measurement as an operational voltage of the read element. If the fly height increases monotonically (FIG. 5(b)), or alternatively, decreases monotonically (FIG. 5(c)) within a measured range, a common-mode voltage may be selected out of the measured range.

With further reference to FIGS. 5(a)-5(c), in accordance with one embodiment of the present invention, the HDC/MPU 23 may estimate the common-mode voltage for the highest fly height in the common-mode voltage adjustment. Thus, in one embodiment of the present invention, the fly height may not be measured at all measurable common-mode voltages. In another embodiment of the present invention, the optimum common-mode voltage is determined in a minimal number of measurements in order to reduce the processing time. Therefore, in accordance with embodiments of the present invention, the HDC/MPU 23 measures the fly height at a portion of the measurable common-mode voltages and determines the common-mode voltage for the highest fly height. For example, each graph in FIG. 5 shows all measured values. The HDC/MPU 23 measures the fly height for some portion of these common-mode voltages. The fly-height variation may exhibit any of the three forms shown in FIG. 5.

One of the forms includes the common-mode voltage for the highest fly height within the measurement range of the common-mode voltage and the fly height decreases with the increase and decrease from the common-mode voltage for the highest fly height (FIG. 5(a)). In another form, the fly height increases monotonically within the measurement range of the common-mode voltage (FIG. 5(b)). In the last form, the fly height decreases monotonically within the measurement range of the common-mode voltage (FIG. 5(c)). Whichever form of change the fly height may exhibit, the HDC/MPU 23 first selects a common-mode voltage and starts the measurement of the fly height at the selected common-mode voltage. The measurement start common-mode voltage is the selected value that is selected from values other than the maximum and minimum values within the measurement range. In an embodiment of the present invention, the HDC/MPU 23 selects the optimum value determined at the last measurement, or alternatively, the value closest to the last optimum value within common-mode voltages used in the fly-height measurement. This value is stored in a nonvolatile memory such as the magnetic-recording disk 11, or alternatively, an EEPROM.

With further reference to FIGS. 5(a)-5(c), in accordance with another embodiment of the present invention, the HDC/MPU 23 may determine the common-mode voltage used in the first measurement from: the last optimum value, the drive temperature, which is the temperature detected by the temperature sensor 17, at the last measurement, and the drive temperature at the current measurement. As described in the discussion of FIG. 4, the voltage of the magnetic-recording disk 11 varies with temperature. Thus, the HDC/MPU 23 may estimate the voltage change of the magnetic-recording disk 11 from the last measurement caused by temperature change and may estimate approximately the optimum common-mode voltage from the voltage change of the magnetic-recording disk 11. Starting the measurement from this common-mode voltage helps reduce the processing time. Alternatively, the HDC/MPU 23 may prepare data specifying the graphical relationship between the drive temperature and the measurement start common voltage and select the first common-mode voltage according to the data and the drive temperature. Next, the HDC/MPU 23 selects the next higher or next lower common-mode voltage than the first common-mode voltage and measures the fly height. The HDC/MPU 23 may determine which of the common-mode voltages to select from the graphical relationship between the drive temperature at the last measurement and the drive temperature at the current measurement. For example, if the first common-mode voltage is the last optimum common-mode voltage, the HDC/MPU 23 selects the lower common-mode voltage if the temperature has decreased and the higher common-mode voltage if the temperature has increased. As described above, the HDC/MPU 23 sets discrete values of the common-mode voltage within a specific range. The HDC/MPU 23 compares fly-height values at the first and the next common-mode voltage and determines a gradient over a portion of the range of common-mode voltage values including the two measured points. If the gradient is positive, the HDC/MPU 23 performs the next measurement at a common-mode voltage higher than the two common-mode voltages. Typically, the HDC/MPU 23 selects the next higher common-mode voltage than the higher voltage of the measured common-mode voltages. If the gradient is negative, the HDC/MPU 23 performs the next measurement at a common-mode voltage lower than the two common-mode voltages. Similarly, the HDC/MPU 23, typically, selects the next lower common-mode voltage than the lower voltage of the measured common-mode voltages.

With further reference to FIGS. 5(a)-5(c), in accordance with embodiments of the present invention, the HDC/MPU 23 may select common-mode voltages sequentially and perform a fly-height measurement at each common-mode voltage. The HDC/MPU 23 may repeat fly-height measurements; and, if the sign of the gradient of fly-height changes, the fly height at the next previous measurement is the highest. If the sign of the gradient does not change, the common-mode voltage at the final measurement is the common-mode voltage at the fly height within the measurement range.

As set forth above, embodiments of the present invention have been described by way of examples without limitation thereto. Embodiments of the present invention may of course be modified in various ways within the spirit and scope of embodiments of the present invention. For example, embodiments of the present invention may be applied to a disk drive with a fly-height adjustment mechanism different from thermal fly-height control (TFC) such as a piezo element. Embodiments of the present invention may also be applied to disk drives other than HDDs. In accordance with embodiments of the present invention, an estimated common-mode voltage may be selected for the highest fly height as the optimum common-mode voltage; however, a common-mode voltage different from the above voltage in terms of factors other than the voltage difference is not precluded from designs within the spirit and scope of embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
    a disk configured to store data;
    a motor configured to rotate said disk;
    a head-slider comprising:
        a slider configured to fly in proximity to a recording surface of said disk; and
        an element on said slider; and
    a controller configured to measure a fly height between said head-slider and said disk at more than two different common-mode voltages of said element to determine an operational common-mode voltage from a measurement result.

2. The disk drive of claim 1, wherein said controller is configured to estimate a common-mode voltage for a highest fly height and is configured to use said element at said estimated common-mode voltage.

3. The disk drive of claim 1, wherein said disk comprises a magnetic-recording disk, and said element comprises a read element of a magnetic-recording head, said read element comprising a magnetoresistive element.

4. The disk drive of claim 1, wherein said disk comprises a magnetic-recording disk, and said element comprises an element of a magnetic-recording head selected from the group consisting of a write element of a magnetic-recording head and a heater element of a magnetic-recording head.

5. The disk drive of claim 1 further comprising:
a mechanism configured to adjust said fly height between said head-slider and said disk;
wherein said controller is configured to measure said fly height by Dakroubing said fly height with said mechanism to bring said head-slider into contact with said disk at said different common-mode voltages.

6. The disk drive of claim 1, wherein said controller is configured to measure said fly height using read-back signals read by a read element.

7. The disk drive of claim 1, further comprising:
a plurality of head-sliders;
wherein said controller is configured to apply said measurement result on said head-slider to all other head-sliders of said plurality of head-sliders.

8. The disk drive of claim 1, wherein said recording surface is divided into a plurality of zones with respective recording frequencies, and said controller is configured to perform a measurement in different zones and is configured to determine a common-mode voltage for each of said different zones.

9. The disk drive of claim 1, wherein said controller is configured to determine a timing for a measurement based on temperature variation from a temperature in a last measurement.

10. The disk drive of claim 1, wherein said controller is configured to start a measurement of said fly height at a measurement-start common-mode voltage, is configured to perform said measurement at a common-mode voltage selected from the group consisting of a higher common-mode voltage than said measurement-start common-mode voltage and a lower common-mode voltage than said measurement-start common-mode voltage, and is configured to continue said measurement of said fly height in a voltage range selected from the group consisting of a higher voltage range than said measurement-start common-mode voltage and a lower voltage range than said measurement-start common-mode voltage where said fly height in said voltage range is to be higher than said fly height at said measurement-start common-mode voltage.

11. A method for adjusting common-mode voltage of an element of a head-slider in a disk drive, said method comprising:
rotating a disk;
measuring a fly height of said head-slider flying in proximity to a recording surface of said rotating disk at more than two different common-mode voltages of said element;
determining an operational common-mode voltage from a measurement result; and
operating said element at said operational common-mode voltage.

12. The method of claim 11, further comprising:
estimating a common-mode voltage for said highest fly height; and
using said element at said estimated common-mode voltage.

13. The method of claim 11, wherein said measuring measures said fly height by Dakroubing said fly height with a mechanism to bring said head-slider into contact with said disk at different common-mode voltages.

14. The method of claim 11, wherein said measuring measures said fly height using read-back signals read by a read element.

15. The method of claim 11, wherein said disk drive comprises a plurality of head-sliders associated with a plurality of respective recording surfaces, and said measurement result on said head-slider is applied to all other head-sliders of said plurality of head-sliders.

16. The method of claim 11, wherein said recording surface is divided into a plurality of zones with respective recording frequencies, measurements in different zones are performed, and a common-mode voltage for each of said different zones is determined.

17. The method of claim 11, wherein said determining determines a timing for a measurement based on temperature variation from a temperature in a last measurement.

18. The method of claim 11, wherein said measuring starts a measurement of said fly height at a measurement-start common-mode voltage, measures said fly height at a common-mode voltage selected from the group consisting of a higher common-mode voltage than said measurement-start common-mode voltage and a lower common-mode voltage than said measurement-start common-mode voltage, and continues said measurement of said fly height in a voltage range selected from the group consisting of a higher voltage range than said measurement-start common-mode voltage and a lower voltage range than said measurement-start common-mode voltage where said fly height in said voltage range is to be higher than said fly height at said measurement-start common-mode voltage.

* * * * *

UNITED STATES PATENT AND TRADEMARK OFFICE
CERTIFICATE OF CORRECTION

PATENT NO. : 8,125,727 B2  Page 1 of 1
APPLICATION NO. : 12/562589
DATED : February 28, 2012
INVENTOR(S) : Kazushi Tsuwako et al.

It is certified that error appears in the above-identified patent and that said Letters Patent is hereby corrected as shown below:

On the Title page:

Item (75) Assignee - Delete: "Hitachi Global Storgae Technologies, Netherlands B.V., Amsterdam (NL)"
Insert: --Hitachi Global Storage Technologies, Netherlands B.V., Amsterdam (NL)--

Signed and Sealed this
Twenty-seventh Day of November, 2012

David J. Kappos
*Director of the United States Patent and Trademark Office*